No. 847,108. PATENTED MAR. 12, 1907.
J. R. PLAUK.
FENDER.
APPLICATION FILED MAY 19, 1906.
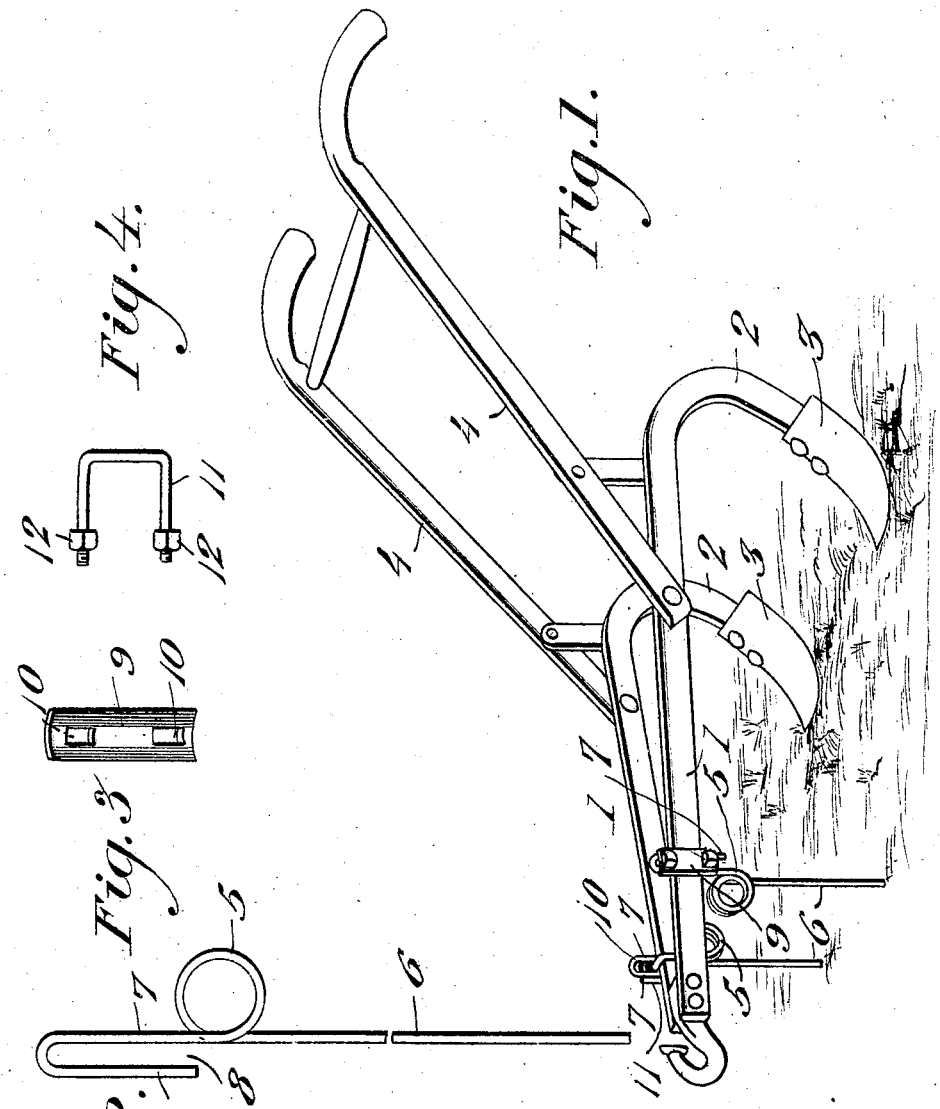
Inventor
James Reed Plauk.
Witnesses
Phil. E. Barnes
J. A. Elmore
By Victor J. Evans.
Attorney

UNITED STATES PATENT OFFICE.

JAMES REED PLAUK, OF CAMDEN, INDIANA.

FENDER.

No. 847,108.  Specification of Letters Patent.  Patented March 12, 1907.

Application filed May 19, 1906. Serial No. 317,780.

*To all whom it may concern:*

Be it known that I, JAMES REED PLAUK, a citizen of the United States, residing at Camden, in the county of Carroll and State of Indiana, have invented new and useful Improvements in Fenders, of which the following is a specification.

My invention has relation to improvements in fenders for plows; and it consists in the construction and arrangement of parts, as will be hereinafter described, and particularly pointed out in the claim.

In the accompanying drawings, Figure 1 is a perspective view of a plow equipped with fenders embodying the invention. Fig. 2 is a side elevation of one of the fenders. Fig. 3 is a face view of the clip member or washer. Fig. 4 is an elevation of the clip-bolt.

Referring to the drawings, it will be seen that the plow, which is of the usual construction and material, comprises a plurality of beams 1, having at their rear ends downturned shanks 2, equipped with blades 3, the plow being provided with handles 4 of ordinary form.

Mounted on each of the beams 1 is a fender composed of a single piece or length of spring metal suitably shaped between its ends to form a coil 5, beneath which there is extended a downwardly-projecting fending arm or portion 6 and above which the material is folded upon itself to produce a substantially U-shaped engaging portion presenting spaced side pieces 7, between which there is formed a downwardly-opening space 8, it being noted in this connection that the arm 6 extends in longitudinal continuance of one of the side pieces 7, but that when the device is in use the spring 5 yields to permit the arm to spring rearwardly in overriding obstructions. For attaching the fenders to the beams 1 there is employed for each fender a clip-plate 9 of slightly-curved form on cross-section having a pair of elongated openings or slots 10, designed to receive respectively, the arms of a substantially U-shaped clip-bolt 11, applied around the beam and having tapped onto its arms nuts 12, which bear on the outer face of the plate, between which and the outer face of the beam the U-shaped engaging portion of the fender is disposed, said clip-plates 9 being located on the outer sides of the beams 1, it being noted that in connecting the parts the arms of the bolt 11 are extended through the space 8 and, further, that owing to the space 8 being open at its lower end the engaging portion may be readily seated or removed from between the beam and clip-plate by loosening the nuts 12.

In practice the fenders are connected with the respective beams 1, with one of the fenders disposed somewhat in advance of the other, whereby the lower ends of the arms 6 which contact with the ground surface and will travel on a line drawn diagonally of the row adjacent to opposite sides of which the arms move. As the plow advances over the ground stalks or other obstructions which may extend transversely across the row of plants will be engaged by one or the other of the fender-arms 6 and turned thereby to a position parallel with the row, whereby the advancing plows 3 may freely pass such obstructions without incurring liability of throwing them into contact with and breaking down or otherwise damaging the plants, while the arms will, owing to the provision of the coils 5, ride freely over stones or analogous obstructions. It is to be noted that the fenders are adjustable in a direction longitudinally of the beams for properly positioning the lower ends of the arms 6 relative to each other and to the blades 3.

Having thus described my invention, what I claim is—

A structure of the character described comprising a plurality of plow-beams, each having a fender connected thereto, each of said fenders consisting of a strip of metal bent at one end into U-shaped form so as to provide two straight parallel arms of different lengths, the longer one of which is provided with a coiled spring formed thereon and extending forwardly therefrom, and means for slidably attaching and detaching the U-shaped bend of each fender of the plow-beam, consisting of U-shaped clips having arms to embrace said beam, clip-plates 9 located on the outer side of the U-shaped bend and curved inwardly on cross-section, and having openings arranged one above the other for the passage therethrough of the arms which serve to clamp the U-shaped ends of each fender between the plow-beams and said plates, substantially as described.

In testimony whereof I affix my signature in presence of two witnesses.

JAMES REED PLAUK.

Witnesses:
J. W. RUSSELL,
O. M. PAYTON.